…

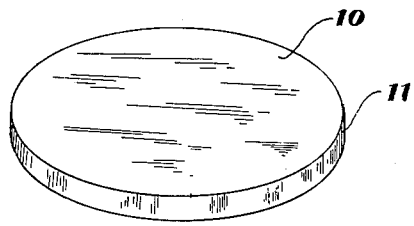
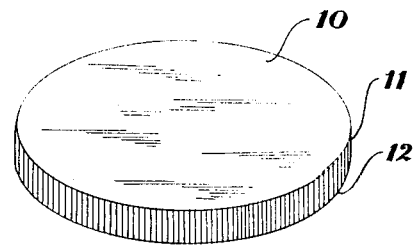
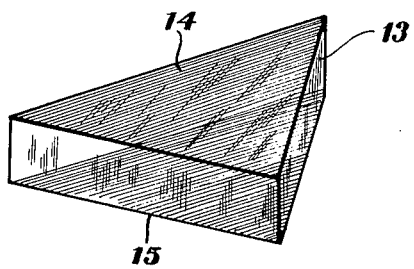
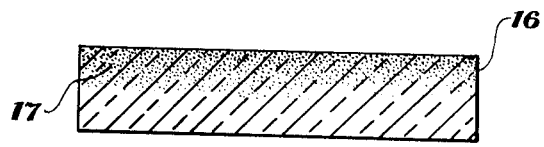

United States Patent Office 2,748,020
Patented May 29, 1956

2,748,020

GLASS HAVING INTERFACE OF REDUCED LEAD AND DIFFUSED SILVER

William F. Parsons, Rochester, N. Y., and Juanita N. Little, Gainesville, Fla., assignors to Eastman Kodak Company, Rochester, N. Y., a corporation of New Jersey Original application October 27, 1950, Serial No. 192,467, now Patent No. 2,649,387, dated August 12, 1953. Divided and this application April 17, 1953, Serial No. 349,408

3 Claims. (Cl. 117—33.3)

This invention relates to non-reflecting coatings on glass and more particularly to black coatings of reduced lead on glass which are non-reflecting at the internal interface, and to methods for their production.

This is a division of our copending application Serial No. 192,467 filed October 27, 1950, now Patent 2,649,387 of August 12, 1953.

An object, therefore, of the present invention is to provide a method for the production of black coatings on glass which are non-reflecting at their internal interfaces.

Another object of the invention is to provide a method for the production of black, non-reflecting coatings in optical glass which is adapted for use in optical assemblies to absorb substantially all of the light impinging on certain areas such as the edges of lenses and the sides of prisms.

A further object is to provide a method for producing black, non-reflecting abrasive resistant coatings on either flint or crown glasses which will withstand temperature extremes of the order of 600° F. to −85° F.

Still another object of the invention is to provide glass articles including glass optical elements such as lenses and prisms having a black integral coating thereon which is non-reflecting at the interface.

The invention will be further understood by reference to the following detailed description and drawings in which:

Fig. 1 is a perspective view of a lens to be coated with a non-reflecting coating in accordance with the invention;

Fig. 2 is a similar view of the lens of Fig. 1 which has been edge coated in accordance with the invention;

Fig. 3 is an optical prism having only the upper and lower faces coated with our non-reflecting coating; and Fig. 4 is a cross-section of a lens blank showing the gradual dispersion of the metal coating into the surface of the lens.

In accordance with the invention these and other objects are attained by methods now described. It is known when a lead glass is heated in an atmosphere of hydrogen or other reducing gas at a temperature high enough to permit diffusion of the gas into the glass surface, that a black coating of reduced lead will be formed in the glass surface. The thickness of this layer varies with the glass and the the time and temperature of reducing, but its minimum thickness appears to be about 0.001 inch. This coating, however, is not desirable for some applications in optical work because the reflection from the internal interface is too high.

We have found if a lead glass is stained by diffusing a coating of silver into the surface and the surface of the glass is then reduced under the proper conditions, that the reflection from the internal interface is cut down to a desirable extent not heretofore attainable by ordinary blackening procedures. This coating has the added advantage of being able to withstand much greater extremes of temperature than black coatings prepared by employing known inks. The coating is stable up to the temperature that will oxidize the metallic lead in the glass surface. This temperature varies with the glass, but should preferably be at least above 500° F. The coating is also as resistant to abrasion and chemical action as the glass itself. Under any treatment to which a piece of optical glass is normally subjected, the coating could be expected to hold up as long as the glass.

In producing these coatings conditions of temperature and length of heating were found to be somewhat critical and these conditions varied with the type of glass. Silver appears to diffuse into a glass by Na+ replacement in a linear, or approximately linear, gradation; the silver concentration being greater at the surface. The distance of diffusion depends on the concentration of silver applied to the surface and the time and temperature of diffusion. Too much heat during silver staining tends to coalesce the colloidal silver, forming a white precipitate in the glass surface. When this is reduced, the coating appears blue and the reflection is too high. If the silver is diffused too far into the surface the reflection is not substantially diminished.

The temperature at which the glass is reduced is also somewhat critical. If it is too low the glass is not reduced. If it is too high the glass surface may become disrupted and pitted. All heat treatment must be below the softening point of the glass.

We have found that the presence of silver in a lead glass causes the lead to be reduced at a lower temperature than that in a glass containing no silver. For instance, when a silver stained glass and a plain lead glass are reduced simultaneously in hydrogen for one hour at 700° F. the glass containing silver is found to be substantially more opaque. A longer reducing time does not produce the desired coating without the presence of silver. Since the depth of the diffused silver is somewhat critical and since silver was found to assist reduction, we base the phenomena of decreased reflection on the premise that a graded interface of reduced lead is formed at the glass surface. That is, that the concentration of lead atoms gradually decreased from the glass-air interface to the internal interface of the coating.

It will be apparent from the foregoing description that the necessary theoretical requirements for high absorption are fulfilled by these coatings. As the light, traveling in the glass, approaches the absorbing coating it must encounter no rapid or instantaneous changes in either refractive index or absorption index. These facts are rigorously established by the general equation for normal incidence which is:

(1)
$$R=\frac{(n_0-n)^2+(n_0x_0-nx)^2}{(n_0+n)^2+(n_0x_0+nx)^2}$$

where $n_0$ and $n$ are the refractive indices of the glass and the coating, respectively, and $x_0$ and $x$ are the absorption indices of the glass and coating respectively. It is important to note that even though there are no rapid refractive index changes, it is possible to have high reflection resulting from rapid absorption index changes. Thus, if we set $n_0=n$ in (1) above, we obtain (2)
$$R=\frac{(x_0-x)^2}{4+(x_0+x)^2}$$

It is obvious that if $x_0$ differs appreciably from $x$ then R will have an appreciable value. Now it will be found by substituting numerical values into (1) that if the $n$ and $x$ values vary in small increments or gradually, that light be brought from a transparent medium into an absorbing medium with vanishingly small reflections resulting.

With these facts in mind, it is apparent why the coatings composed of lead and silver and displaying a gradual change in $n$ and $x$ value are highly absorbing, while the sharp absorption resulting from simple reduced lead is highly reflective.

In producing these coatings we found that good transparent yellow to amber silver staining was obtained on all lead glasses if the surface was chemically silvered and then the glass was heated in an oven in an oxygen-containing atmosphere at a temperature below the softening point of the glass until the desired depth of diffusion was reached. 1000° F. for 15 hours was satisfactory for Corning G–10 glass. For lower melting glasses 850° F. for 15 to 60 hours was used. If diffusion took place at the softening point of the glass, a turbid coating resulted with the possible formation of Liesegang rings.

750° F. was found to be the lowest practical reducing temperature for lead glasses, Corning G–10, DF–3, and Corning #8391. Best results were obtained by reducing in hydrogen for one hour at 850° F. A temperature above 900° F. was too high and the glass surface was disturbed.

The practice of our invention with lead glass can be carried out by employing the following steps: (1) Chemically silver, evaporate, or otherwise deposit silver on the glass surface to be coated. That is any suitable silvering method known to the art can be employed. (2) Heat the glass in an oven in an oxygen atmosphere at a temperature which will cause the silver to diffuse into the glass surface not yet coalesced. It is desirable when coating small pieces to place them in the oven on a polished lava block. The block and the glass can then be removed from the oven while hot thereby lessening the chance of cracking the glass. (3) Reduce the silver stained glass in an atmosphere of hydrogen for one hour at 850° F. The above-described coatings are most satisfactorily employed on glass optics when they are applied before the optical surfaces are polished.

Since it is also desirable to produce absorbing coatings on glasses which do not contain lead, it is also a feature of our invention to provide a suitable method to do that.

We have found that under the proper conditions, lead, deposited either as the metal or as a salt, can be fluxed into a glass surface at a temperature below the softening point of the glass. When the proper concentration of lead is employed for the type glass being coated, this layer of lead glass is quite stable, transparent, and free from cracks and bubbles. Conditions as to the amount of lead, temperature and length of time of fluxing vary with the glass being coated.

Lead borate, lead acetate, powdered lead glass, evaporated lead, and chemically deposited lead sulfide are all suitable as fluxing materials. We found that a simple, inexpensive way to produce this layer of lead glass on lead-free glass is to deposit an even coating of 300 mesh lead powder and then heat the glass at a temperature just below its softening point. 200 mesh powder may be used, but the smoothest surfaces are obtained with the finest powders.

In order to hold the lead powder firmly to the glass article, the surface to be coated is covered with a thin film of light grease. A dilute solution of grease in benzene is applied by brushing, spraying, or other means, and this deposit is smoothed to a continuous film.

The glass article to be leaded is then placed on a rigid support and covered with a 2½ foot glass column of 3 inches in diameter. The lead powder is sieved at the top of the column and allowed to fall undisturbed through the air space and land at random on the grease coating on the glass. The purpose of the air column is to distribute the lead particles so that an extremely uniform coating of the desired depth is obtained. Areas on the article may be protected by employing any easily removable masking material as Scotch tape, a solution of polyvinyl alcohol in water, Tygon, a solution of cellulose acetate in acetone or other suitable materials. It is also possible to wipe the surfaces clean if they have become contaminated with lead. A concentration of lead of approximately $0.006 \pm .003$ gm./sq. cm. of surface gives the desired results on boro silicate and soda lime glasses, the actual concentration being determined by the glass composition.

This amount of lead was found to adhere well enough to the film of grease that a lens edge could be coated by rotating the lens without danger of the lead falling off the surface.

The lead-coated glass article is then placed, coated side up, on a lava block and heated in an oven at a temperature of approximately 1000° F. depending on the type of base glass, until the lead has completely disappeared from the surface. A normal firing time is 15 hours. The oven is cooled slightly and then the object is removed on the lava block. If complete firing occurred, the surface will be practically transparent and free from ripples. From this point the article is treated as a lead glass, and the silvering, diffusing and reducing methods are followed as described above.

If properly applied these coatings are as stable as those produced on a base lead glass and will withstand temperature extremes of 600° F. to −85° F. and are as resistant to chemical action and abrasion as any lead glass.

As shown in the drawings numeral 10 in Fig. 1 indicates a lens to be treated in accordance with the invention to have a black non-reflecting coating placed on the edges 11. Fig. 2 shows the lens after it has been treated for instance as described in Example 1 or 2 to place a black coating 12 thereon of reduced lead. Fig. 3 is a view of a prism 13 the upper and lower surfaces 14 and 15 having been treated as in Example 3 or 4 to produce a black, non-reflecting surface thereon. Fig. 5 is a cross-section view of a lens 16 showing how the diffused metal particles 17 are gradually dispersed from the surface area toward the interface between the clear glass and the black coating.

The following examples further illustrate the invention.

*Example 1*

Several uncentered lenses of DF–3 glass are chemically silvered along the edge and heated in an oven at 850° F. for 15 hours. The silvered edges then range in appearance from dark yellow to amber. The lenses are cooled and placed in a tube-like oven through which magnesium perchlorate dried hydrogen is passed at the rate of ½ liter per minute and burned at the exit. The lenses are heated thus for 1 hour and 10 minutes and the oven is allowed to cool at least to 400° F. before the hydrogen is turned off and the samples removed. The total time involved is about 3½ hours. The optical surfaces are polished and the internal reflection at the edges of the lens is then shown to be cut down by the expected amount.

*Example 2*

The edges of C–1 glass lenses of 1¼ inches diameter are greased and coated with 0.005 gram of 300 mesh lead powder per square cm. of surface. The lenses are held by a suction cup applied to a lens face and rotated while being coated with lead. They are then heated on lava blocks for 15 hours at 1000° F. The edges are chemically silvered and the lenses are heated again at 850° F. for 15 hours. The lenses are cooled and heated in an atmosphere of hydrogen as in Example 1 for two hours. On removal from the oven an even black coating with a non-reflecting interface is present on the lens edges.

*Example 3*

The sides of 1 cm. edge BSC–2 glass prisms are greased and coated with 0.006 gm./sq. cm. of 300 mesh lead powder. The prisms are supported on their vertex with blocks of BSC–2 glass, so that the prism faces are not touched and heated for 15 hours at 1100° F. The sides are then chemically silvered and heating is resumed at 850° F. for 15 hours. These prisms are reduced in hydrogen for 2 hours at 850° F. The optical surfaces of these prisms are unchanged.

Example 4

Many camera range finder prism systems are unsatisfactory because of objectionable reflections from the ground sides of the prisms. The coating described herein eliminates these reflections. To mass produce prisms having these coatings large sheets of the required glass are ground on both sides to give the glass the required thickness and surface. These sheets are then coated on both sides by the procedures already indicated. Then the individual prisms are sawed or cut from the sheets by customary procedures. In this process the black coatings are not harmed and prisms result which have non-reflecting sides.

We claim:

1. A glass article having on at least one surface a non-reflecting graded interface of reduced lead and diffused silver.

2. A glass optical element having on at least one surface a non-reflecting graded interface of reduced lead and diffused silver.

3. Glass having a black, opaque, abrasion-resistant, non-reflecting integral coating thereon of reduced lead and diffused silver which will withstand temperature extremes of the order of 600° F. to −85° F.

References Cited in the file of this patent
UNITED STATES PATENTS

| Number | Name | Date |
|---|---|---|
| 1,181,754 | Ferriter | May 2, 1916 |
| 2,315,328 | Hood et al. | Mar. 30, 1943 |
| 2,456,241 | Axler et al. | Dec. 14, 1948 |
| 2,501,563 | Colbert et al. | Mar. 21, 1950 |
| 2,597,562 | Blodgett | May 20, 1952 |